United States Patent
Shao et al.

(10) Patent No.: US 10,162,792 B2
(45) Date of Patent: Dec. 25, 2018

(54) METHOD AND SYSTEM FOR HIGH PRECISION TIME SYNCHRONIZATION

(71) Applicant: Baidu USA LLC, Sunnyvale, CA (US)

(72) Inventors: Wesley Shao, Cupertino, CA (US); Vivek Surabhi, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 105 days.

(21) Appl. No.: 15/292,921

(22) Filed: Oct. 13, 2016

(65) Prior Publication Data

US 2018/0107626 A1 Apr. 19, 2018

(51) Int. Cl.
*G06F 13/38* (2006.01)
*G06F 13/42* (2006.01)
*G06F 9/4401* (2018.01)
*G06F 9/38* (2018.01)
*G06F 1/14* (2006.01)

(52) U.S. Cl.
CPC ............ *G06F 13/4295* (2013.01); *G06F 1/14* (2013.01); *G06F 9/3814* (2013.01); *G06F 9/4406* (2013.01); *G06F 2213/0026* (2013.01)

(58) Field of Classification Search
CPC ...................................................... G06F 13/38
See application file for complete search history.

(56) References Cited

U.S. PATENT DOCUMENTS

| | | | | |
|---|---|---|---|---|
| 5,724,316 A | * | 3/1998 | Brunts | G01C 21/3697 |
| | | | | 340/988 |
| 8,116,405 B2 | * | 2/2012 | Cho | H04J 3/0664 |
| | | | | 342/357.22 |
| 2009/0219205 A1 | * | 9/2009 | Jazra | G01S 19/25 |
| | | | | 342/357.64 |
| 2010/0329285 A1 | * | 12/2010 | Stanton | G06F 1/14 |
| | | | | 370/503 |

(Continued)

FOREIGN PATENT DOCUMENTS

CN 104865824 A * 8/2015

OTHER PUBLICATIONS

CN104865824—all pages (Year: 2015).*

(Continued)

*Primary Examiner* — David E Martinez
(74) *Attorney, Agent, or Firm* — Womble Bond Dickinson (US) LLP

(57) ABSTRACT

In one embodiment, a dedicated time processing device inserted into a peripheral bus coupling or embedded with at least some of the rest of system components (e.g., processor, memory) of a data processing system to synchronize a system clock of the data processing system. The peripheral bus can be a Peripheral Component Interface (PCI) bus, a PCI Express (PCIe) link, a PCI extended (PCI-X) bus, or the like. The time processing device receives high precision time from a high precision time source, such as global positioning system (GPS) time source. The time processing device decodes and processes the received time and stores (Continued)

the time in an internal time register. The time processing device further includes an interface to allow an external component (e.g., a processor) to retrieve with low latency the time stored in the time register for the purpose of synchronizing the system clock.

17 Claims, 6 Drawing Sheets

(56) References Cited

U.S. PATENT DOCUMENTS

| | | | |
|---|---|---|---|
| 2012/0142372 A1* | 6/2012 | Rosay | G01S 19/256 455/456.1 |
| 2013/0042136 A1* | 2/2013 | Xu | H04W 56/00 713/400 |
| 2015/0003211 A1* | 1/2015 | Imamura | G04R 20/04 368/47 |
| 2015/0185705 A1* | 7/2015 | Oshita | G04R 20/04 368/28 |

OTHER PUBLICATIONS

CN104865824—EPO—Translation (machine translation)—all pages (Year: 2015).*
NMEA Output Description—all pages (Year: 2014).*

* cited by examiner

| Register Name | Type | Bit | Description |
|---|---|---|---|
| Date Register 311 | RO | | GPS Sync Timestamp (mm:dd:yy) SW needs to access High Precision Register first to get updated value of Date Register |
| | | 31:24 | Reserved |
| | | 23:0 | NTP date: mmddyy |
| Low Precision Register 312 | RO | | GPS Sync Timestamp (hh:mm:ss) SW needs to access High Precision Register first to get updated value of Low Precision Register |
| | | 31:24 | Reserved |
| | | 23:16 | GPS Sync Time: hour (0-23) |
| | | 15:8 | GPS Sync Time: minute (0-59) |
| | | 7:0 | GPS Sync Time: second (0-59) |
| High Precision Register 313 | RO | | GPS Sync Timestamp (ms:us:ns) |
| | | 31:20 | GPS Sync Time: mili-second (0-999) |
| | | 19:8 | GPS Sync Time: micro-second (0-999) |
| | | 7:1 | GPS Sync Time: nano-second count, one count is 10ns |
| | | 0 | 1: GPS Sync Time & Date are valid |

FIG. 4

METHOD AND SYSTEM FOR HIGH PRECISION TIME SYNCHRONIZATION

TECHNICAL FIELD

Embodiments of the present invention relate generally to time synchronization of a data processing system. More particularly, embodiments of the invention relate to high precision time synchronization of a data processing system.

BACKGROUND

One of the difficult problems in an embedded world is to keep track of very accurate time. Time is universal and constant across all devices on or near earth. Keeping track of time accurately would allow distributed systems naturally stay in synchronization. Network time protocol (NTP) is a mechanism that would allow computers or devices connected over a network to retrieve time across the network from a NTP server. If a NTP server can stay within microsecond level accuracy, the computers would be a millisecond accuracy due to unpredictable network latency.

Proprietary devices such as those used to implement NTP servers lack general use. Such proprietary devices are in general very expensive. Most approaches require software to be designed to propagate the time. Unfortunately, the more instructions have to be executed, the more latency would be introduced thus degrade the accuracy. Also, the more the software gets involved the more it is susceptible to preemption by an operating system (OS) scheduler thus introduce further delay. Many such devices are based on low bandwidth serial interfaces (e.g., RS-232), which are slow in general.

BRIEF DESCRIPTION OF THE DRAWINGS

Embodiments of the invention are illustrated by way of example and not limitation in the figures of the accompanying drawings in which like references indicate similar elements.

FIG. 4 is a block diagram illustrating examples of time registers of a time processing device according to one embodiment of the invention.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a dedicated time processing device inserted into a peripheral bus coupling or embedded with at least some of the rest of system components (e.g., processor, memory) of a data processing system to synchronize a system clock of the data processing system. The peripheral bus can be a peripheral component interface (PCI) bus, a PCI Express (PCIe) link, a PCI extended (PCI-X) bus, or the like. The time processing device receives high precision time from a high precision time source, such as global positioning system (GPS) time source. The time processing device decodes and processes the received time and stores the time in a set of one or more internal time registers. The time processing device further includes an interface to allow an external component (e.g., a processor) to retrieve with low latency the time stored in the time register for the purpose of synchronizing the system clock.

In one embodiment, an apparatus operating as a time processing device includes a PCIe interface capable of coupling to a processor over a PCIe bus, a time register, and time processing logic coupled to the time register. The time processing logic is to receive time data representing date and time from a time data source and to decode and store the time data in the time register. The processor can retrieve the time data from the time register via a single read instruction over the PCIe bus and updates a system clock associated with the processor based on the time data. The time data source may be a GPS data source and the time data may be extracted from a GPS signal received from the GPS data source.

Figure 1:
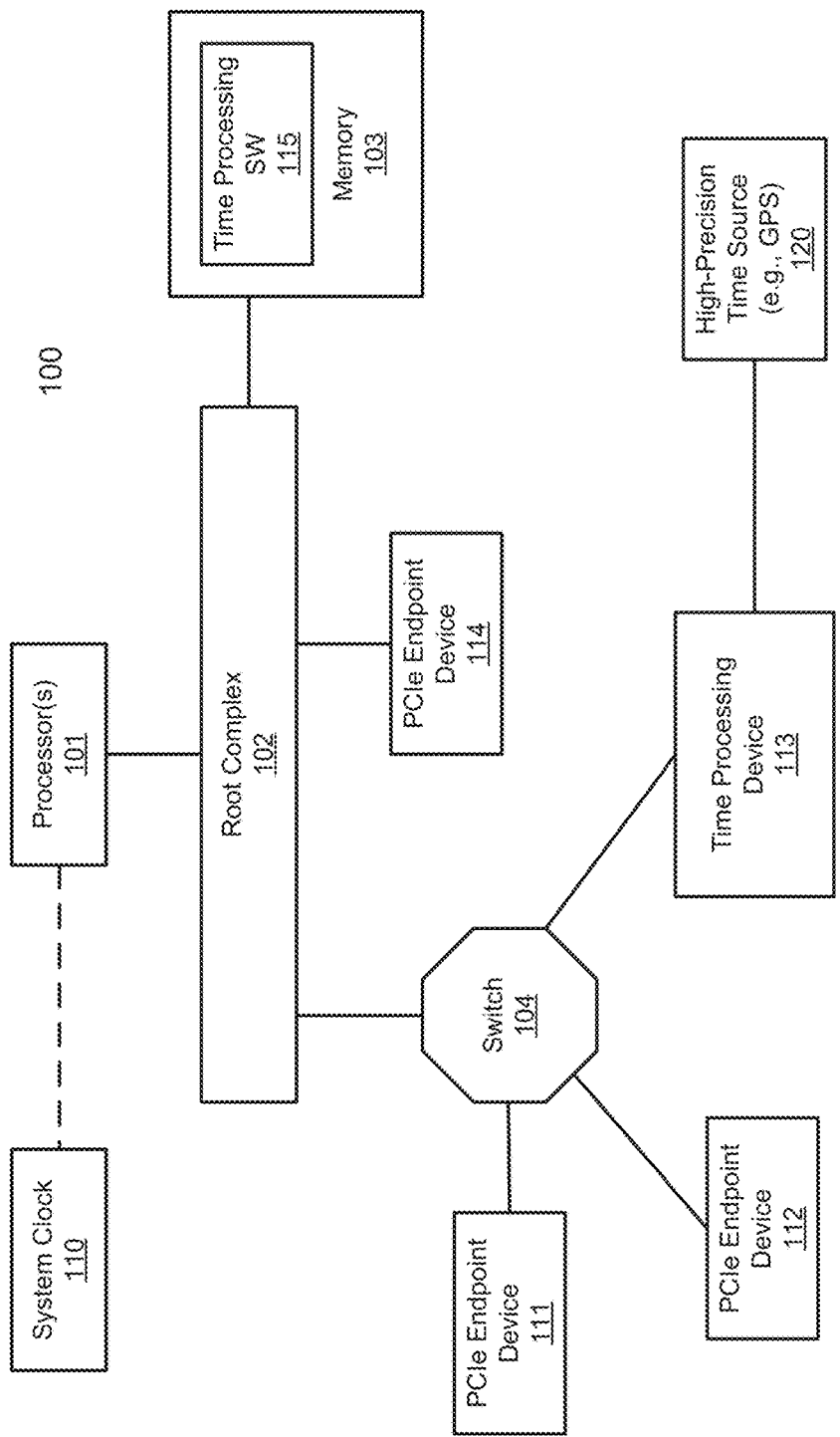
FIG. 1 is a block diagram illustrating a data processing system which may be utilized with an embodiment of the invention.

FIG. 1 is a block diagram illustrating a data processing system which may be utilized with an embodiment of the invention. Referring to FIG. 1, in this example, system 100 is a PCIe compatible system. PCIe is a high-speed serial computer expansion bus standard. PCI Express is based on point-to-point topology, with separate serial links connecting every device to the root complex (host). A PCIe link supports full-duplex communication between any two endpoints, with no inherent limitation on concurrent access across multiple endpoints. PCIe communicate via a logical connection called an interconnect or link. A link is a point-to-point communication channel between two PCIe ports allowing both of them to send and receive ordinary PCI requests (configuration, I/O or memory read/write) and interrupts.

In this embodiment, one or more processors 101 and memory 103 are coupled to root complex 102. In a PCIe system, root complex device 102 connects processor(s) 101 and memory subsystem 103 to a PCIe switch fabric composed of one or more switch devices, such as switch 104. Similar to a host bridge in a PCI system, root complex 102 generates transaction requests on behalf of processor (s) 101, which is interconnected through a local bus. Root complex functionality may be implemented as a discrete device, or may be integrated with the processor. Root complex 102 may contain more than one PCIe port and multiple switch devices can be connected to ports on the root complex or cascaded.

A PCIe endpoint device (e.g., any input/output or IO device) can be inserted into a PCIe bus coupled to any of switch 104 or root complex 102. In this example, PCIe endpoint devices 111-113 are coupled to a downlink port of switch 104, where an uplink port of switch 104 is coupled to root complex 102. In addition, additional endpoint devices such as endpoint device 114 can be coupled to root complex 102.

In one embodiment, system 100 includes a time processing device coupled to a PCIe bus. Such a time processing device can be coupled to switch 104 or root complex 102. For the purpose of illustration, the time processing device is part of PCIe endpoint device 113 coupled to switch 104. Time processing device 113 is also coupled to a high precision time source 120 (e.g., a GPS time source) to periodically receive time information such as date and time. In one embodiment, time processing device 113 includes time processing logic to receive, decode, and store the time information from time source 120 (also referred to as a time data source) in a time register within time processing device 113. Further, time processing software 115 may be loaded in memory 103 and executed by processor 101. Time processing software 115, when executed by processor 101, causes processor 101 to issue a command (e.g., single command) to time processing device 113 to retrieve the time information stored therein and to update (e.g., synchronize) a local system clock 110. With the low latency of a PCIe bus, processor 101 can retrieve the time information in a very short period of time, e.g., at a microsecond level.

Figure 2:
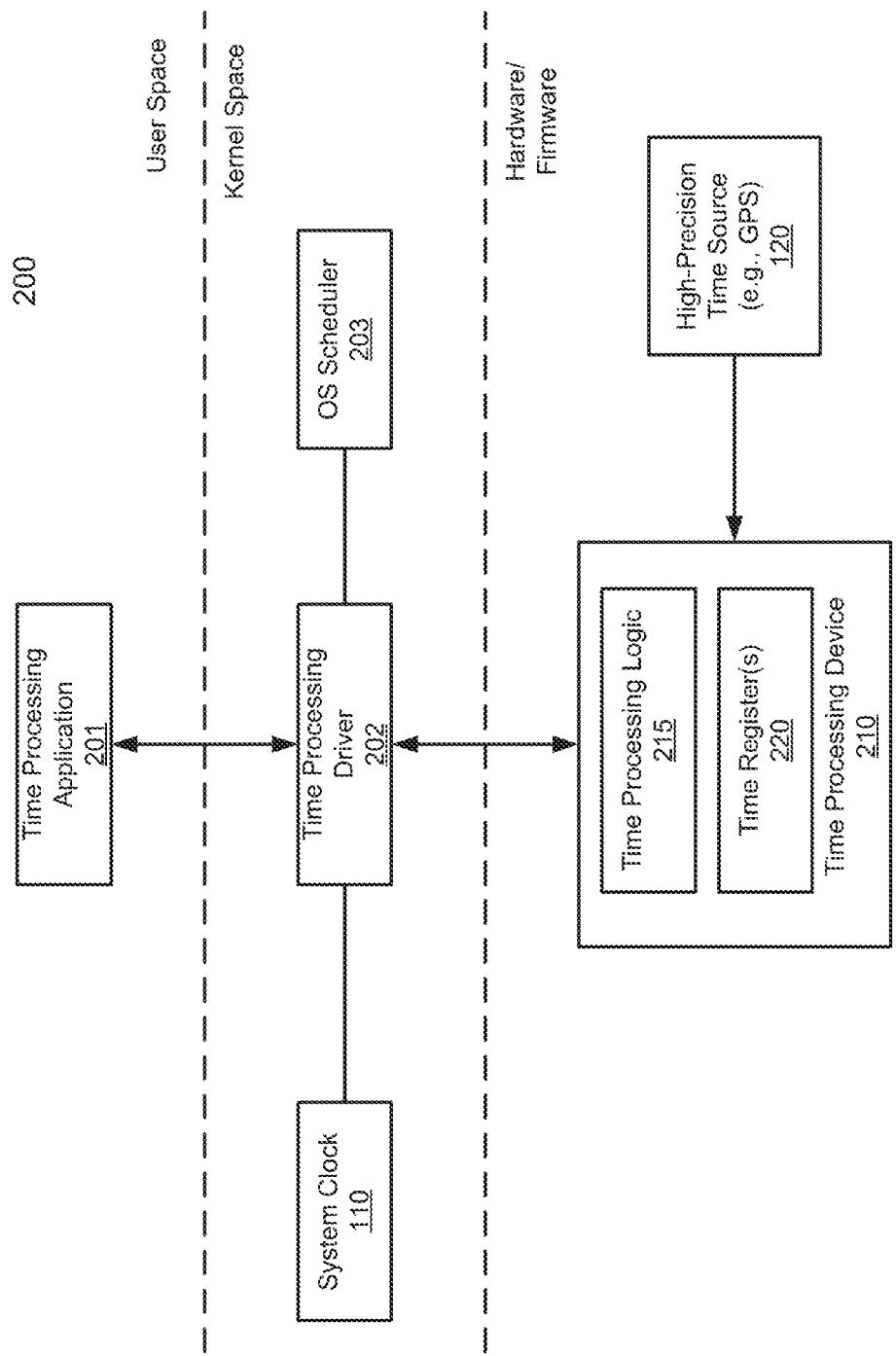
FIG. 2 is a block diagram illustrating an architecture of a data processing system according to one embodiment of the invention.

FIG. 2 is a block diagram illustrating an architecture of a data processing system according to one embodiment of the invention. System 200 may be implemented as part of system 100. Referring to FIG. 2, system 200 includes a time processing application 201 running at a user space of an OS, time processing driver 202 running at a kernel space of the OS, and time processing device 210 as part of the hardware and/or firmware. Time processing device 210 may represent any of PCIe endpoint devices 111-114 of FIG. 1. Time processing device 210 may be implemented as a field programmable gate array (FPGA), an application specific integrated circuit (ASIC), or a processor.

Time processing device 210 is coupled to time source 120, where time source 120 periodically sends time information to time processing device 210. Time source 120 may be a GPS time source, a BEIDOU navigation system time source, a GLONASS time source, or any other atomic clocks. In one embodiment, time processing device 210 includes time processing logic 215 and time register 220. In response to the time information received from time source 120, time processing logic 215 decodes, processes, synchronizes the time information in one or more time registers 220 and also maintains the sub-second value based on its local clock, an in-between seconds boundary. Time processing application 201 can sends a request for time update to time processing driver 202, periodically or in response to a user request.

In response to the request, time processing driver 202 issues a read request to time processing device 210 to retrieve the time information from time register 220. Prior to issuing the read request, time processing driver 202 may communicate with the kernel of the OS to stop or suspend OS scheduler 203 from scheduling other tasks, such that time processing driver 202 may update the system after fetching current time without delay. Note that time register 220 may be IO register or a memory mapped IO register that is mapped to a PCI configuration space associated with time processing device 210. The time information stored in time register 220 can be retrieved via a single instruction of a processor. Based on the time information retrieved from time register 220, time processing driver updates or synchronizes system clock 110. Due the low latency of the PCIe architecture, the time information can be retrieved at microsecond precision level.

Figure 3:
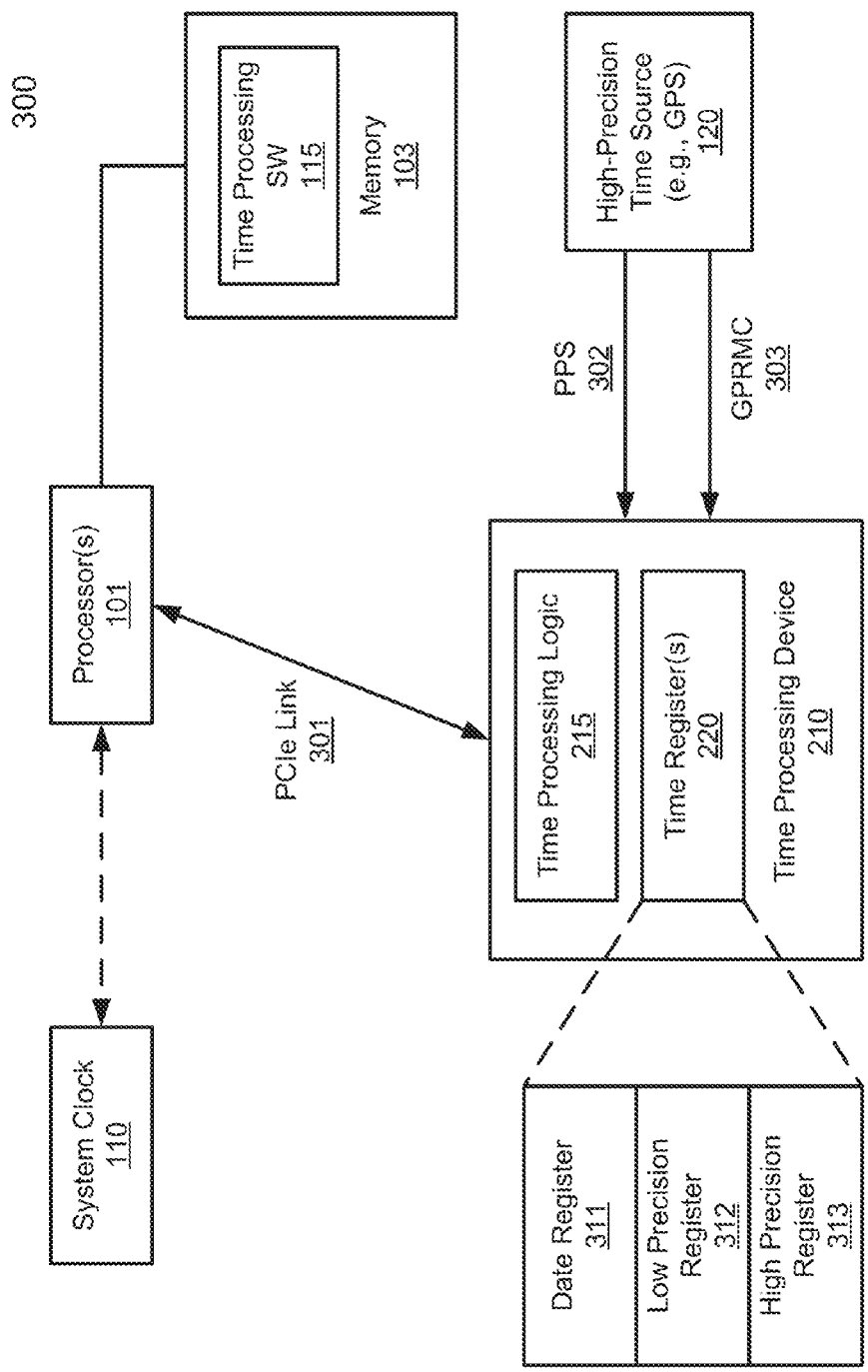
FIG. 3 is a block diagram illustrating a high precision time synchronization mechanism according to one embodiment of the invention.

FIG. 3 is a block diagram illustrating a high precision time synchronization mechanism according to one embodiment of the invention. Referring to FIG. 3, system 300 may be implemented as a part of system 100 of FIG. 1 or system 200 of FIG. 2. In this embodiment, time processing device 210 is implemented as a PCIe device (e.g., FPGA, ASIC, or processor) inserted into a PCIe bus. As a result, time processing device 210 is communicatively coupled to processor 101 via PCIe link 301. On the other hand, time processing device 210 is coupled to time source 120, in this example, a GPS time source. In one embodiment, time source 120 may be a GPS receiver that periodically receives time data from a base station or a satellite.

In one embodiment, time processing device 210 includes a first interface or input to receive a signal via path 302 from time source 120 indicating that time data is available and a second interface or input to receive a message containing the time data via path 303. The signal received from the first input may be a pulse-per-second (PPS) compatible signal. The message received from the second input may be a GPRMC compatible message, which may be a part of recommend minimum specific GPS/transit data of the national marine electronics association (NMEA) standard. A PPS signal is an electrical signal that has a width of less than one second and a sharply rising or abruptly falling edge that accurately repeats once per second. PPS signals are output by radio beacons, frequency standards, other types of precision oscillators and some GPS receivers. A PPS signal does not specify the time, but merely the start of a second and is in general at nanosecond precision level. A GPRMC message contains the date and time information.

In one embodiment, time register 220 includes date register 311 to provide date information, low precision register 312 to provide hour, minute, and second time information, and high precision register 313 to provide millisecond, microsecond, and nanosecond time information. In response to detecting the PPS signal at the first input via path 302, time processing logic 215 receives a GPRMC message from the second input via path 303. Time processing logic 215 decodes the GPRMC message to extract the date d time information, synchronizes the date a e information in registers 311-313, and maintains the sub-second value based on the local clock, in-between seconds boundary in register 313.

Subsequently, when a read request is received from a client, for example, time processing software 115, for reading the time information, time processing logic 215 retrieves the time information from registers 311-313 and return to the time information to the client for the purpose of updating system clock 110. In one embodiment, dependent upon how frequent the read requests have been received, sometimes a read action to high precision register 313 may be sufficient. For example, if a current read request is received less than a second after a previous request, there is no need to read date register 311 and low precision register 312 since the second, minute, hour, and date information would not change between the two read requests.

The boundary of a second can be determined by monitoring the PPS signals received via path 302. The contents of the high precision register 313 are reset on a second boundary and are updated based on the local clock in increments of its time period, in-between the second's boundary. The content of low precision register 312 is updated once per second based on the PPS signals. Similarly, the content of date register 311 is updated once per day. Thus, the data of date register 311 and/or low precision register 312 may be prefetched, for example, on a per-second basis, to further reduce the time to retrieve time information from high precision register 313. High precision register 313 may be accessed at the frequency of the internal clock of the system, and be completed at a fraction of a microsecond. In one embodiment, when high precision register 313 is accessed, date register 311 and low precision register 312 are automatically locked to prevent any change of the content stored therein. A read to low precision register 312 may unlock date register 311 and high precision register 313.

FIG. 4 is a block diagram illustrating examples of time registers of a time processing device according to one embodiment of the invention. Referring to FIG. 4, each of time registers 311-313 is a 4-byte (32-bit) register. In one embodiment, bits 0-23 of date register 311 are used to store date information, for example, in an "mmddyy" format. Bits 0-7 of low precision register 312 are used to store second information (e.g., 0-59 seconds). Bits 8-15 of low register 312 are used to store minute information (e.g., 0-59 minutes). Bits 24-31 of low precision register 312 are used to store hour information (e.g., 0-23 hours). Bits 1-7 of high precision register 313 are used to store nanosecond count, where one count represents 10 nanosecond. Bits 8-19 of high precision register 313 are used to store microsecond information (e.g., 0-999 microseconds). Bits 20-31 of high precision register 313 are used to store millisecond information (e.g., 0-999 milliseconds). Bit 0 is used to indicate whether the time and date stored in registers 311-313 are valid, which is set by time processing logic 215 if the received GPRMC message indicates the time source, e.g. GPS lock has been acquired and content of the GPRMC message is valid. Note that registers 311-313 are shown and described for the purpose of illustration only. Other formats may also be applied herein. For example, registers 311-313 can be replaced by two 64-bits registers or a single 128-bit register.

Figure 5:
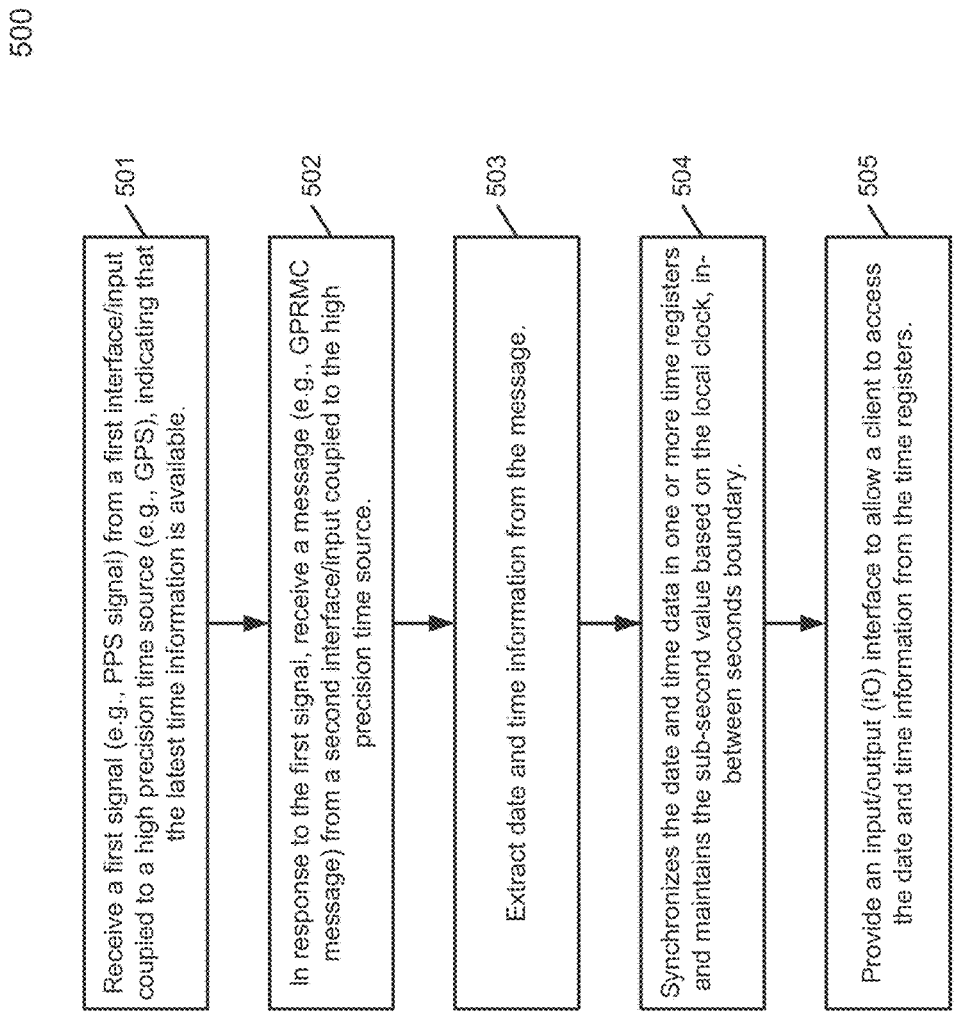
FIG. 5 is a flow diagram illustrating a process of synchronizing time from a high precision time source according to one embodiment of the invention.

FIG. 5 is a flow diagram illustrating a process of synchronizing time from a high precision time source according to one embodiment of the invention. Process 500 may be performed by time processing logic 215 of time processing device 210 as shown in FIG. 2. Referring to FIG. 5, at block 501, processing logic receives a first signal (e.g., PPS signal) from a first interface coupled to a high precision time source (e.g., GPS time source), indicating that new time data is available. In response to the first signal, at block 502, processing logic receives a message (e.g., GPRMC message) from a second input coupled to the high precision time source. At block 503, processing logic decodes the time data to extract date and time data from the message. At block 504, processing logic synchronizes the date and time data in one or more time registers (e.g., time registers 311-313) and maintains the sub-second value based on the local clock, in-between seconds boundary. At block 505, processing logic provides an IO interface to allow a client (e.g., a processor, an application, or driver) to retrieve the date and time data from the time registers.

Figure 6:
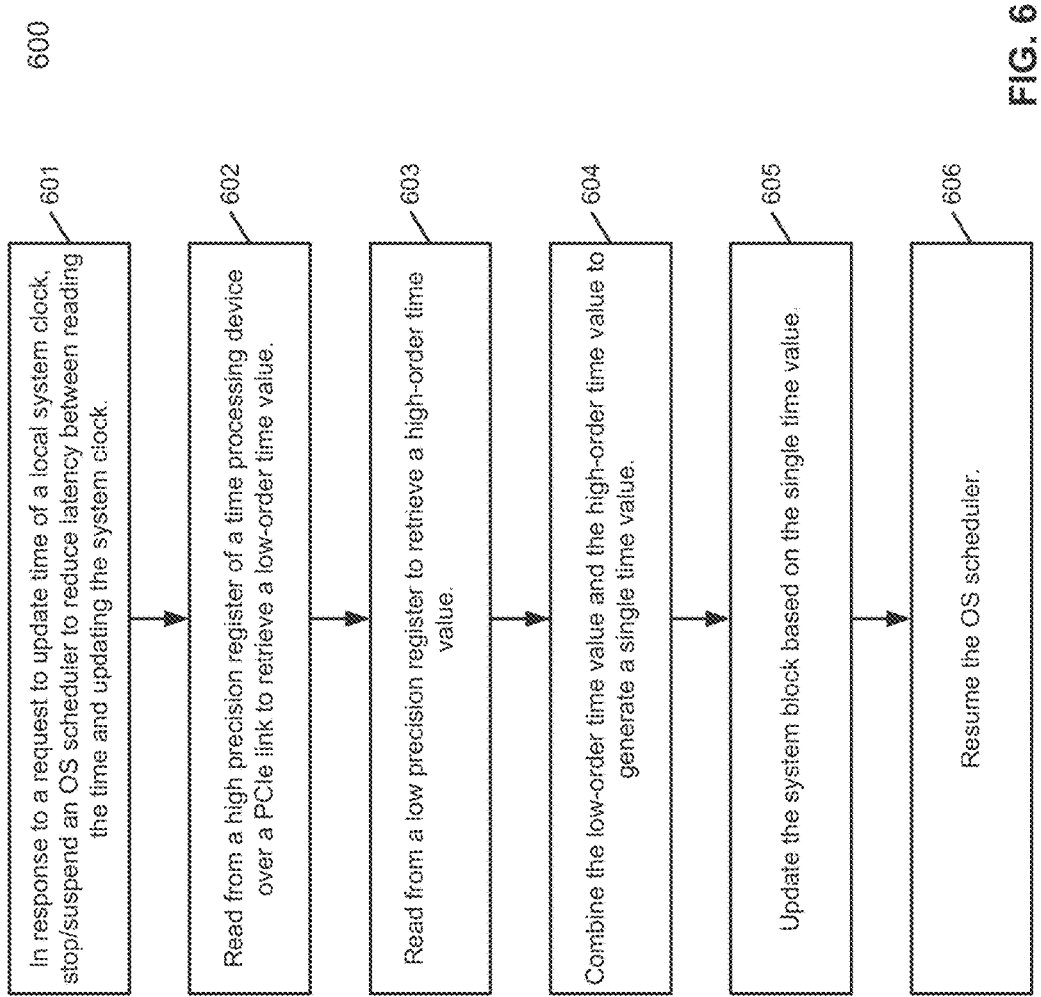
FIG. 6 is a flow diagram illustrating a process of synchronizing time from a high precision time source according to another embodiment of the invention.

FIG. 6 is a flow diagram illustrating a process of synchronizing time from a high precision time source according to another embodiment of the invention. Process 600 may be performed by processing logic which may include software, hardware, or a combination thereof. For example, process 600 may be performed by time processing software 115 of FIG. 1. Referring to FIG. 6, at block 601, in response to a request to update time received from a client, processing suspends an OS scheduler to reduce the delay to read the time and update a system clock. At block 602, processing logic reads from a high precision register of a time processing device over a PCIe link to retrieve a low order time value. At block 603, processing logic reads from a low precision register to retrieve a high order time value. At block 604, processing logic combines the low order time value and the high order time value to generate a single time value. At block 605, processing logic updates a local system clock based on the single time value. At block 606, processing logic resumes the OS scheduler.

The techniques described above can be applied to a variety of data processing systems that requires high precision time synchronization. In one embodiment, the systems described above and shown in FIGS. 1-4 can be implemented as a part of a computer system that controls an autonomous vehicle. An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A data processing system, comprising:
   a processor;
   a Peripheral Component Interface Express (PCIe) link; and
   a time processing device coupled to the processor via the PCIe link, the time processing device including time processing logic and a time register, wherein the time processing logic is to receive time data representing date and time from a time data source, and store the time data in the time register,
   wherein the time processing device comprises
       a first input to receive a first signal from the time data source, the first signal indicating that an update of the time data is available from the time data source, and
       a second input to receive a message having the updated time data from the time data source,
   wherein the time processing logic is to
       detect the first signal received from the first input,
       in response to the first signal, decode the time data received from the second input, and
       store the decoded time data in the time register, and
   wherein the processor retrieves the time data from the time register via a single read instruction over the PCIe link and updates a system clock of the data processing system based on the time data.

2. The system of claim 1, wherein the time data source is a global positioning system (GPS) compatible source that provides GPS time.

3. The system of claim 1, wherein the first signal comprises a pulse-per-second (PPS) signal, and wherein the message is a GPRMC compatible message.

4. A data processing system, comprising:
   a processor;
   a Peripheral Component Interface Express (PCIe) link; and
   a time processing device coupled to the processor via the PCIe link, the time processing device including time processing logic and a time register, wherein the time processing logic is to
       receive time data representing date and time from a time data source, and store the time data in the time register, wherein the time register comprises:
           a first register to store date information,
           a second register to store hour, minute, and second information, and
           a third register to store millisecond, microsecond, and nanosecond information, and
   wherein the processor retrieve e data from the time register via a single read instruction over the PCIe link and updates a system clock of the data processing system based on the time data.

5. The system of claim 4, wherein the time data source is a global positioning system (GPS) compatible source that provides GPS time.

6. The system of claim 5, wherein the time processing device further comprises a locking logic to lock at least one of the first register or the second register to prevent data stored the first register or the second register from changing, in response to a read request to read from the third register.

7. The system of claim 5, wherein in response to a read request for updating time, the time processing logic reads from the third register without reading from the first register and the second register, and wherein data stored in the first register and the second register is prefetched prior to receiving the read request before an OS scheduler is disabled.

8. The system of claim 7, wherein the second register is accessed on a boundary of a second and the first register is accessed on a boundary of a day.

9. A data processing system, comprising:
   a processor;
   a Peripheral Component Interface Express (PCIe) link;
   a time processing device coupled to the processor via the PCIe link, the time processing device including time processing logic and a time register, wherein the time processing logic is to
       receive time data representing date and time from a time data source, and
       store the time data in the time register, wherein the processor retrieves the time data from the register via a single read instruction over the PCIe link and updates a system lock of the data processing system based on the time data, and
   a memory hosting an operating system (OS) and a time processing driver executed within a kernel of the OS by the processor, wherein the time processing driver is to
       suspend a scheduler of the OS,
       read from the time register via a single instruction,
       resume the scheduler of the OS, and
       update the system clock.

10. The system of claim 9, wherein the time data source is a global positioning system (GPS) compatible source that provides GPS time.

11. A time processing device, comprising:
    a Peripheral Component Interface Express (PCIe) link capable of coupling to a processor via a PCIe link;
    a time register;
    time processing logic coupled to the time register, wherein the time processing logic is to receive time data representing date and time from a time data source, and store the time data in the time register, wherein the processor retrieves the time data from the time register via a single read instruction over the PCIe link and updates a system clock associated with the processor based on the time data;
    a first input to receive a first signal from the time data source, the first signal indicating that an update of the time data is available from the time data source;
    a second input to receive a message having the updated time data from the time data source, wherein the time processing logic is to
        detect the first signal received from the first input, in response to the first signal, decode the time data received from the second input, and store the decoded time data in the time register.

12. The device of claim 11, wherein the first signal comprises a pulse-per-second (PPS) signal, and wherein the message is a GPRMC compatible message.

13. The device of claim 11, wherein the time data source is a global positioning system (GPS) compatible source that provides GPS time.

14. A time processing device, comprising:
   a Peripheral Component Interface Express (PCIe) link capable of coupling to a processor via a PCIe link;
   a time register, wherein the time register comprises:
      a first register to store date information,
      a second register to store hour, minute, and second information, and
      a third register to store millisecond, microsecond, and nanosecond information; and
   time processing logic coupled to the time register, wherein the time processing logic is to
      receive time data representing date and time from a time data source,
      store the time data in the time register, wherein the processor retrieves the time data from the time register via a single read instruction over the PCIe link, and
      update a system clock associated with the processor based on the time data.

15. The device of claim 14, further comprising a locking logic to lock at least one of the first register or the second register to prevent data stored the first register or the second register from changing, in response to a read request to read from the third register.

16. The device of claim 14, wherein in response to a read request for updating time, the time processing logic reads from the third register without reading from the first register and the second register, and wherein data stored in the first register and the second register is prefetched prior to receiving the read request.

17. The device of claim 16, wherein the second register is accessed on a boundary of a second and the first register is accessed on a boundary of a day.

\* \* \* \* \*